Sept. 23, 1969
E. PÖTZL
3,468,675
PROCESS FOR THE PREPARATION OF A DRY FOOD PRODUCT
CONCENTRATE IN LUMPS
Filed Jan. 13, 1966
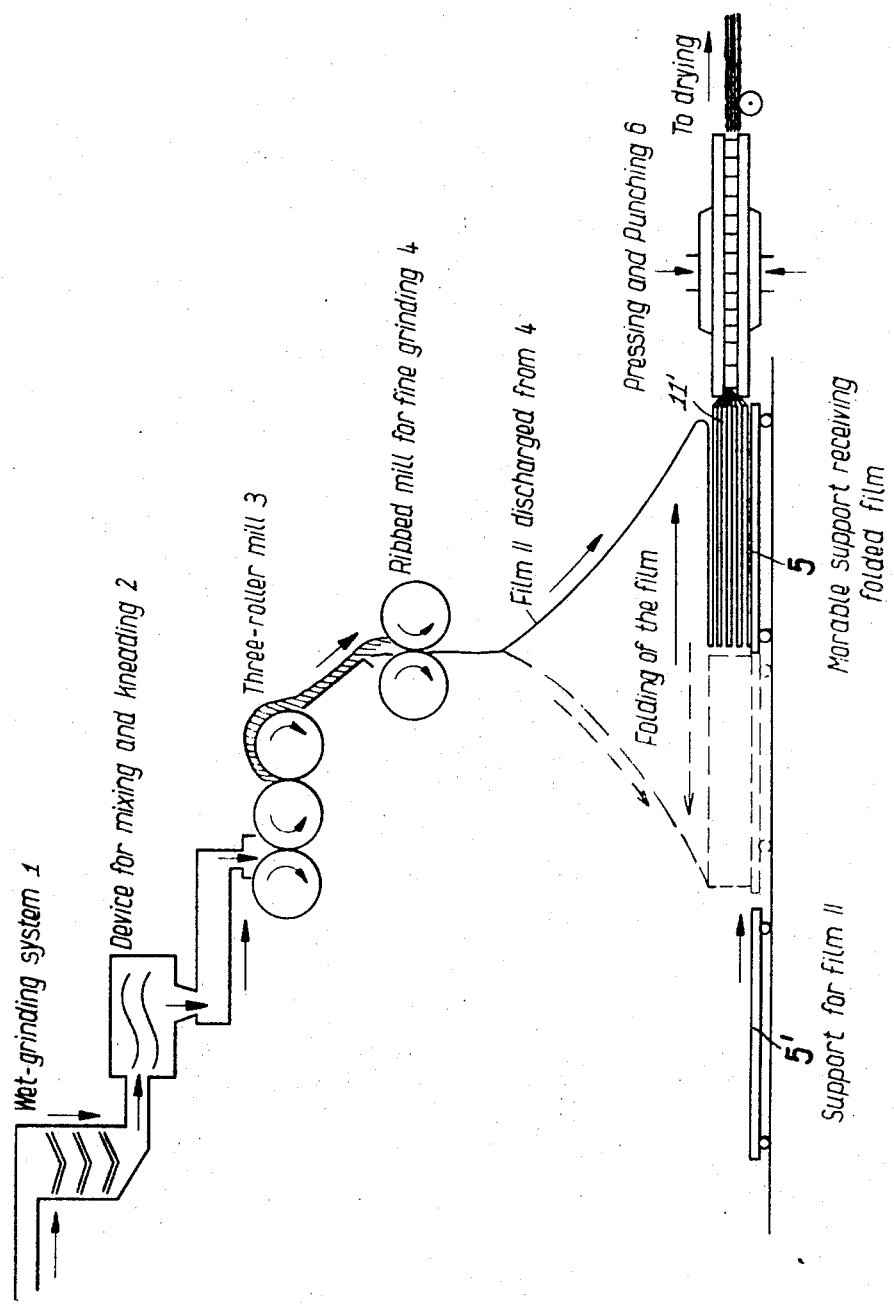
Inventor:
ERNST PÖTZL
BY DEZSOE STEINHERZ > United States Patent Office 3,468,675
Patented Sept. 23, 1969

3,468,675
PROCESS FOR THE PREPARATION OF A DRY
FOOD PRODUCT CONCENTRATE IN LUMPS
Ernst Pötzl, Uetersen, Holstein, Germany, assignor to
H. W. Appel Feinkost A.G., Hannover, Germany
Filed Jan. 13, 1966, Ser. No. 520,496
Claims priority, application Germany, Jan. 14, 1965,
P 35,868
Int. Cl. A23l 1/00; B01d 1/00
U.S. Cl. 99—199                                      10 Claims

ABSTRACT OF THE DISCLOSURE

A process of preparing a food concentrate miscible with liquids, wherein a pasty mass is shaped in the form of a film having a thickness not substantially exceeding one half millimeter, and wherein the film is then folded and the folded film is compressed, subjected to drying and cut before or after drying to form lumps.

---

The present invention relates to the preparation of a dry food product concentrate in lumps.

Dry food products which have been adjusted to specific uses by preparing them from suitable ingredients, have been hitherto prepared as powder, flakes, or flat pieces and it was always endeavored in the prior art processes to attain improved stability, easy transportability and saving of space.

Said food products prepared in pulverulent form or in form of flakes were always consumed in mixture with a liquid. This necessity limited their consumption under conditions, in which a liquid as well as containers and tools for mixing, for example a spoon, were available, unless the dilution resulted in a mixture which was suitable for being consumed by drinking.

Thus, in railroad trains, on marches and walking trips and also during sports exercises as well as in cases of a catastrophy, such preparations could not be utilized.

Compressed tablets or the like become rather hard after a short time according to experience, so that they cannot be consumed in dry condition and their conversion by soaking in liquids has also not resulted in the formation of an edible paste.

It is an object of the present invention to provide a food product concentrate, in whch all ingredients necessary for the human or animal nutrition are present and which can be consumed in dry condition as well as in mixture with liquids. Therefore, the products of the present invention can be used without limitation under all conditions, in which humans and animals have to eat food products.

It is a further object of the present invention to provide food product concentrates which can be consumed even after extended storage without impairment of their taste and nutritive properties.

The food product concentrates according to the present invention can be prepared for any desired use, i.e. for example also as a dietetic food product, and their taste can be varied in accordance with specific requirements.

The process of the invention for preparing a dry food product concentrate in the form of dry lumps which can be mixed with liquids, is characterized in that the ingredients of the components used in the preparation are converted with as little as possible of aqueous liquid, to a pasty mass in which the individual ingredients are present in a finely distributed condition. The resulting mixture is then shaped to a pliable thin strand which is laid to zig-zag folds of the desired width, is pressed on, if desired, and dried and the folded strand is divided into parts prior to or after drying. The humidity in the pasty mass is low and amounts in many cases to only about 10–12%.

In carrying out the invention all food products can be used which can be converted into dry condition or into a condition in which they contain only a small amount of liquid. Practically all known food products belong to this group because even food products which are liquid in their natural condition, can be converted by artificial thickening or drying processes into a condition in which they contain only a low proportion of liquid which is utilized in carrying out the process of the invention.

Therefore, in the process according to the invention the product may contain all vital proportions of albumen, carbohydrates, fats and other necessary ingredients such as vitamins, so that the products according to the invention can be adjusted to all fields of application.

According to a further feature of the invention, to the mixture to be shaped binding or swelling ingredients, such as for example dextrinized starch, gelatin, alginates, pectins, and the like, can be added if necessary.

Mixing of the ingredients with the necessary amount of liquid can be carried out in a conventional mixing or kneading machine.

It has been found to be of advantage to prepare the pasty mass by wet grinding.

The ingredients of the mixture can be mixed in dry condition and the small amount of liquid which is necessary for attaining the pasty condition can be added to the mixture. However, one or more ingredients of the mixture can be added to the other ingredients in a condition in which the necessary amount of liquid is already present in them.

In order to obtain the pasty mass liquids can be used with advantage which occur in natural food products or are natural food products such as for example milk, fruit juices, vegetable juices and the like. However, in very many cases mere water can be used in order to obtain the pasty product of the invention.

The shaping of the pasty mass should be preferably carried out in such manner that a wide continuous film of a thickness of e.g. 0.2–0.5 mm. is produced. This shaping process to a continuous band can be carried out for example by means of a multiple-roller device or by squeezing the mass through a slot-shaped nozzle.

In carrying out this shaping process it has been found to be of extraordinary advantage to use the solid ingriedients of the mass in a very finely distributed condition. Therefore, the mass can be either submitted to wet-grinding for a sufficiently long period of time and this grinding can be carried out by means of a crushing mill. Or the mass can be subjected after the wet grinding to homogenizing in a conventional homogenizing device.

In carrying out the process of the invention the film-forming device discharges a uniform pliable thin film, the consistency of which prevents running together of the mass to a paste of uniform structure. It has been surprisingly found that this effect can be easily controlled in the desired manner by the use of said small addition of liquid. For example, a wet-grinding device can be used in which three grinding discs of varying degree of fineness are arranged on axes which can be switched on one after the other. As the three wet-grinding steps take place in a closed system, it is possible to proceed under pressure, whereby the pressing in of the masses in the subsequent discs is increased in intensity. Furthermore, between the film-forming device and the folding procedure a predrying of the unfolded film can take place in order to support this effect. Such predrying can be carried out by a stream of dry heated air, if for example a somewhat higher amount of humidity is used in preparing the pasty mass.

In order to provide the product to be prepared according to the invention in a sufficiently porous condition, it can be provided prior to the folding of the film-band for example with corrugations of a depth of ½ mm. This can be done for example by treating the mass with ribbed rollers.

Folding takes place subsequently by means of devices in which the desired dimension of the zig-zag folds can be adjusted.

Folding can be for example carried out by arranging below the film which is discharged from the film-forming device in vertical direction, a support which has an adjustable stroke and is moved horizontally to and fro; thereby the crest of the folds can be equalized by vertically extending limiting walls. Thus, folding takes place in a space which is open on top and at the bottom and has a rectangular cross-section and determines dimensions of the cross-section of the folded endless film.

For example, the film discharged from the film-forming device is taken up by a movable flat plate of 1 m.$^2$ which is moved on rolls in horizontal direction to and fro.

In this manner the continuously discharged film is compelled to be folded in folds of a breadth of 1 m. The movement of the plate to and fro is synchronized with the velocity of the film discharged.

If the deposited film has attained the desired height or number of folds, a conveyor belt passes it between horizontal jaws, where it is pressed to a suitable thickness and simultaneously cut to pieces of the desired dimensions.

In the meantime another empty supporting plate has been put under the film continuously discharged from the rolls. The process is controlled fully automatically.

After folding, the mass must be dried in order to put it in finished condition, in which it contains humidity in the amount of, for example, 5 to 6%.

Prior to or after this drying process the strand formed is divided into sections of desired size, by means of conventional devices, e.g. knives, wires, punchers, saws and the like.

The molded pieces shaped in the desired form are transported for example by means of a conveyor belt to a drying system. After drying, packaging is carried out preferably in water-tight weldable, sterile foils.

According to a further feature of the present invention, in order to obtain a particularly loose structure, the product prepared in the above described manner can be subjected to drying by heating the humid product under pressure and suddenly releasing the pressure.

It is also possible to prepare according to the invention a product which consists of several layers of different food ingredients.

Therefore, according to a still further feature of the invention at least two separately prepared film bands consisting of different ingredients can be folded together and subjected to the further treatment as described. Such a lamination is particularly advisable if the prepared food product contains a certain amount of fat. The necessary amount of fat is thereby added to one layer only, which forms part of the end product consisting of two or more layers.

It will be appreciated from the above that the mass or masses obtainable according to the present invention can be given any desired kind of taste, either by combination of basic ingredients or by addition of substances capable of imparting the desired taste.

The products obtained in the above described manner can be eaten in the form in which they are taken from their package. They have a surprisingly crisp character. The fibrous or laminated structure which is clearly visible on the lumps yields a great surface and can be therefore quickly mixed to a paste or yield a solution in water or aqueous liquid, forming a liquid of pleasant taste.

It is also possible to warm the product of the invention, for example in the case of a higher meat content, prior to consumption, for example by shortly grilling it or shortly frying it in a pan.

The invention is further illustrated by the following examples to which the invention is not limited.

As examples of basic ingredients the following are mentioned.

Proteins (a) Animal proteins.—Meat or fish of any kind, including dried meat or meat extract, fresh or dried eggs, milk or milk powder.

(b) Vegetable proteins.—Soya beans in form of treated flour or soya milk, lupines, gluten, yeast, if desired in form of extracts, and mushrooms.

Carbohydrates

Various sugars, converted grain in the form of flour or flakes, starches, fruits in natural or dried condition and nuts, for example dates, figs, bananas, raisins, peanuts, hazelnuts, or walnuts.

Fats

Animal and vegetable edible fats. Vegetable in natural or dried form or in form of juice.

Spices

All spices which are conventionally used in the production of food including acids such as citric-, tartaric- and malic acid and aroma substances.

Binding and swelling agents

Dextrinized starch, alginates, pectins, gelatin, semen psylli. Vitamins in pure form or in the form of fruits containing them, for example sea buckthorn berry and hip.

Liquid used for mixing

Water, milk, juices, and sauces.

EXAMPLE 1

| | Kilograms |
|---|---|
| Rice, dry | 45.000 |
| Whole soya flour | 10.000 |
| Beef with medium fat content | 85.000 |
| Soup green | 10.000 |
| Yeast extract, pasty | 1.000 |
| Sodium chloride | 1.000 |
| Meat extract | 4.000 |
| Pepper | 0.300 |
| Soluble starch | 2.100 |
| Sodium alginate | 0.300 |

The beef is boiled in conventional manner with salt and the soup green with little water. The rice is likewise precooked in conventional manner and wiped dry.

The above ingredients are treated in a meat grinder until the desired degree of fineness is attained. At the end of this step, the liquid formed b ycooking the beef and soup green is added.

The mass is homogenized and then fed to a system of rollers and treated to form a film strand as described above. The subsequent steps are: folding, slight pressing of the fold layers and cutting to lumps of the desired size.

The subsequent drying is carried out at about 75–80° C.

EXAMPLE 2

| | Kilograms |
|---|---|
| Crude soya beans | 50.000 |
| Powdered sugar | 108.000 |
| Milk sugar | 3.000 |
| Sodium chloride | 1.000 |
| Calcium carbonate | 1.500 |
| Whole milk powder | 15.000 |
| Sodium alginate | 2.000 |
| Whole soya flour | 12.000 |
| Whole soya meal, particularly rich in albumen | 5.000 |
| Rolled oats | 3.000 |
| Hazelnuts | 15.000 |
| Peanuts, roasted | 11.000 |
| Candied orange peel | 3.000 |
| Candied lemon peel | 5.000 |
| Dried prunes, pitted | 8.000 |
| Dates, pitted | 2.000 |
| Raisins | 9.000 |
| Apricots | 5.000 |
| Figs | 3.000 |
| Fresh orange peel | About 1.000 |
| Skimmed milk powder | 3.500 |
| Cocoa, of about 20% | 10.000 |

The soya beans are washed, steeped, steamed, peeled, and converted by coarse grinding into a thick paste. A very fine further grinding follows until a smooth consistency is attained. The nuts and the dried fruits are subjected to a preliminary comminution. The starting materials thus prepared are weighed into a mixing vessel and the entire mixture is twice passed through a meat grinder; thereby in the last step a fine perforated disc is used. During comminution in the meat grinder 15 liters water are added. The stiff viscous mass formed is introduced into a three-roller rolling mill and is treated therein to form a tender continuous film-like strand. Subsequently the film is folded, pressed to the desired height, cut to pieces and dried at 70–80° C.

EXAMPLE 3

| | Kilograms |
|---|---|
| Crude soya beans | 55.000 |
| Powdered sugar | 50.000 |
| Milk sugar | 7.000 |
| Whole milk powder | 30.000 |
| Sodium chloride | 0.500 |
| Calcium carbonate | 1.500 |
| Calcium lactate | 1.000 |
| Water-soluble lecithin | 0.250 |
| Soluble coffee extract | 4.700 |

The soya beans should be washed, steeped, steamed, peeled, first ground to a coarse powder and subsequently wetground to great fineness. The other ingredients listed above in this example are added in a mixing or kneading device.

The mass is introduced without the addition of liquid into a rolling mill in which a thin strand band is formed and further treatment is carried out as in Example 2. The resulting product has a strong taste of coffee and it can be eaten in solid condition or it can be consumed as a liquid after mixing it with a suitable amount of water.

EXAMPLE 4

| | Kilograms |
|---|---|
| Whole egg powder | 70.000 |
| Whole milk powder | 5.000 |
| Sodium chloride | 0.70 |
| Pepper | 0.20 |
| Soluble starch | 2.500 |
| Roasted onion | 2.000 |
| Boiled ham | 20.000 |
| Fresh leeks | 10.000 |

Ham and leeks are cut to pieces. The starting materials are weighed into a mixing and stirring device and worked with 45 liters of water to a stiff dough. The mass is then passed through a meat grinder and at the end of this step through a disc with a fine hole.

The product thus formed is converted into a strand film, folded, pressed, cut to pieces of the desired size which are dried at about 70° C.

For quick preparation of an instant food product the pieces are wetted with some water or skimmed milk and baked as scrambled eggs with ham, unless it is preferred to eat the pieces directly from the package.

EXAMPLE 5

| | Kilograms |
|---|---|
| Beef, grilled or boiled | 125.000 |
| Pork, grilled | 125.000 |
| Whole egg powder | 9.000 |
| Flour for rolls | 20.000 |
| Sodium chloride | 2.000 |
| Whole soya meal | 30.000 |
| Rolled oats | 3.000 |
| Pepper | 0.400 |
| Marjoram | 0.400 |
| Onions, fresh, cut to pieces | 2.000 |
| Mushrooms,[1] fresh | 3.000 |
| Leeks [1] | 5.000 |
| Soluble starch | 3.000 |

[1] Steamed together.

Roast or boiled beef and pork are cut to pieces of walnut size. The fresh mushrooms and the leeks are steamed with little water. The water formed by steaming is added to the juice of the roast. All starting materials are introduced into a stirring device and mixed.

Subsequently the mixture is twice treated in a meat grinder and the mixed juice of the vegetables and roast is added. A stiff dough-like mass is formed which is treated in a mill having three rollers to form a thin strand, which is folded, moderately pressed, cut to pieces which are dried at 80–85° C.

The dried crisp pieces can be eaten directly or they are fried after being wetted with water and some fat.

EXAMPLE 6

| | | |
|---|---|---|
| Crude soya beans | kg | 190.000 |
| Water for wet-grinding only | l | 60.000 |
| Sodium chloride dissolved in 10 liters water | kg | 1.300 |
| Calcium carbonate added to said 10 liters water | kg | 4.500 |
| Soya oil | kg | 13.000 |
| Sugar | kg | 160.000 |

As a vitamin complex:

| | | |
|---|---|---|
| Vitamin $D_3$ | units | 350.000 |
| Vitamin A | do | 1,750.000 |
| Vitamin C | g | 150 |

The soya beans are washed, soaked in water, acidified with citric acid to a pH 3, for 12 hours, and steamed in order to deprive them of bitterness. After peeling, the beans are passed with addition of the 60 liters water first through a meat grinder and subsequently subjected to a wet-grinding process. In a mixing and kneading machine to the soya mass, which is very finely dispersed, the above listed starting materials are added.

The oily vitamins are dissolved in soya oil and the C vitamin in some of the water prior to their addition.

A thick pasty mass is thus formed which is introduced in a mill having three rollers and milled to form a tender film strand which is folded, pressed, cut to pieces and finally carefully dried at about 70° C.

In this example particular attention should be given to the formation of a very tender film strand, because the product—if it is not eaten in pieces—is dissolved in water in order to form a milk-like liquid.

It will be understood from the above that the present invention is not limited to the specific details described above and can be carried out with various modifications without departing from the scope of the invention as defined in the appended claims.

For example, part of the sugar can be substituted by malt extract or a moderate amount of cocoa can be added to the mass described in the examples.

The process of the invention is diagrammatically illustrated by way of example in the appended drawing.

Referring to the drawing, the food product mixture to be treated according to the invention is passed through a wet-grinding system 1 and subsequently the device 2 for mixing and kneading. The mass discharged from said device 2 enters a three-roller mill 3 and subsequently a ribbed mill 4 for fine grinding and forming corrugations. The film 11 discharged from mill 4 moves downward until it comes to rest on support 5 which moves in horizontal direction to and fro whereby folding of the film is brought about. The folded film 11' is introduced into pressing and punching device 6, in which it is pressed and cut to pieces of the desired size. From there it is passed to a conventional drying plant.

The parts and percent stated herein are by weight if not otherwise stated.

In cooking beef and vegetable in the above Example 1, the amount of water added is in the range of 130 to 150%. Furthermore, a satisfactory fine distribution of the ingredients in the meat grinder is attained if the size of particles of the pasty mass is within the range of 0.2 to 0.5 mm. In Example 4, 15 to 30% of liquid is used for moistening the dry pieces in preparing an instant food product. In Example 5 the vegetable is steamed with the addition of 35 to 70% of water.

What is claimed is:

1. A process of preparing in lumps a substantially dry, edible food concentrate miscible with liquids, comprising the steps of providing a plurality of food ingredients, finely distributing and mixing said ingredients in the presence of a relatively small amount of an aqueous liquid to form a pasty mass, imparting to said mass the shape of a film having a thickness not substantially exceeding one half millimeter, arranging said film in zigzag folds, compressing said folded film, subjecting said folded film to drying, and cutting said folded film in the course of said process to form said lumps.

2. A process as claimed in claim 1, in which an ingredient selected from the group consisting of binding agents and swelling agents is mixed with said food ingredients.

3. A process as claimed in claim 1, in which said pasty mass is prepared by a wet-grinding process.

4. A process as claimed in claim 1, in which said pasty mass is subjected to a multiple rolling operation to form said film.

5. A process as claimed in claim 1, in which said pasty mass is pressed through a slotted nozzle to form said film.

6. A process as claimed in claim 1, in which said film is provided with corrugations prior to its folding and drying.

7. A process as claimed in claim 1, in which said film is caused to extend in a downward direction upon its formation, and during the subsequent folding step is arranged in substantially horizontally directed, superimposed layers on a reciprocable support.

8. A process as claimed in claim 1, including the steps of separately providing additional, different food ingredients, forming at least one additional film from said different ingredients, laminating the first-mentioned film and said additional film, and folding both of said films jointly.

9. A process as claimed in claim 1, in which the drying step is performed by heating said film under pressure, and said pressure is suddenly released after heating to promote formation of a loose structure.

10. A dry edible food concentrate, consumable when dry, and easily miscible with liquid to form a beverage, made by the process defined in claim 1.

References Cited

UNITED STATES PATENTS

| | | | |
|---|---|---|---|
| 1,530,439 | 3/1925 | Testrup et al. | 34—86 |
| 1,908,489 | 5/1933 | Sartakoff | 99—204 |
| 2,385,068 | 9/1945 | Eshbaugh et al. | 99—199 |
| 2,457,063 | 12/1948 | Morgan et al. | 99—208 |

FOREIGN PATENTS

| | | |
|---|---|---|
| 300,261 | 4/1930 | Great Britain. |
| 1,345,292 | 10/1963 | France. |

MAURICE W. GREENSTEIN, Primary Examiner

U.S. Cl. X.R.

99—1, 28, 78; 34—12, 24, 38, 152, 153